United States Patent [19]

George et al.

[11] Patent Number: 4,594,679
[45] Date of Patent: Jun. 10, 1986

[54] HIGH SPEED HARDWARE MULTIPLIER FOR FIXED FLOATING POINT OPERANDS

[75] Inventors: Steven L. George; James L. Hefner, both of Endicott, N.Y.

[73] Assignee: International Business Machines Corporation, Armonk, N.Y.

[21] Appl. No.: 515,845

[22] Filed: Jul. 21, 1983

[51] Int. Cl.[4] .......................... G06F 7/52; G06F 11/00
[52] U.S. Cl. ..................................... 364/754; 364/738; 364/757
[58] Field of Search ............... 364/754, 757, 758, 759, 364/760, 737, 738, 739

[56] References Cited

U.S. PATENT DOCUMENTS

| | | | |
|---|---|---|---|
| 3,508,038 | 4/1970 | Goldschmidt et al. | 364/757 |
| 3,670,956 | 6/1972 | Calhoun | 235/164 |
| 3,873,820 | 3/1975 | Parr et al. | 364/739 |
| 4,130,879 | 12/1978 | Cushing | 364/760 |
| 4,208,722 | 6/1980 | Rasala et al. | 364/760 |
| 4,228,520 | 10/1980 | Letteney et al. | 364/760 |
| 4,338,675 | 7/1982 | Palmer et al. | 364/737 |
| 4,366,548 | 12/1982 | Kregness et al. | 364/737 |
| 4,523,210 | 6/1985 | Kregness | 364/738 |
| 4,528,640 | 7/1985 | Criswell | 364/737 |

OTHER PUBLICATIONS

R. K. Richards, Arithmetic Operations in Digital Computers, pp. 136-140; 160-161 (1955).

Primary Examiner—James D. Thomas
Assistant Examiner—Dale M. Shaw
Attorney, Agent, or Firm—Curtis G. Rose; J. Jancin, Jr.; E. W. Galbi

[57] ABSTRACT

A high speed multiplier unit for multiplying both fixed point and floating point operands is disclosed and claimed. This multiplier unit is a system level functional unit which allows floating point and fixed point operations to be performed directly. In addition to multiplication, the multiplier unit performs exponent calculation, post-normalization, and error detection. The multiplier unit also provides for overlapped loading of operands.

9 Claims, 3 Drawing Figures

HIGH SPEED HARDWARE MULTIPLIER FOR FIXED FLOATING POINT OPERANDS

DESCRIPTION

1. Technical Field

The invention relates to a high speed digital multiplier for fixed and floating point operands.

2. Background Art

In recent years the use of computers for scientific computations has increased tremendously. Typical applications include computer-aided design (CAD), large scale modelling and simulation, computations for the display of graphics, and complex calculations in physics, chemistry and biology. Even the most difficult numeric calculations can be reduced to or approximated by some combination of additions, subtractions, multiplications, and divisions. The latter two are seldom used in straightforward business applications, but multiplication especially is used quite frequently in scientific and engineering programs.

Arithmetic multiplication is defined as a repetition of additions. The multiplicand is added to itself the number of times specified by the multiplier. Humans using pencil and paper usually take one digit at a time of the multiplier times the multiplicand and then add the partial products. This is the basic idea employed by processors which use a combination of microcode and hardware to implement a shift-and-add algorithm. The operands, multiplier and multiplicand, are stored in some binary form. The multiplier is examined a portion at a time. The simplest case involves examining only a bit at a time and assuming only positive operands. The bit being examined determines whether the multiplicand is to be added to the product being accumulated. If the bit is a "1" then the multiplicand is added to the accumulated product. If the bit is a "0" then nothing is added. The new accumulated product is then shifted one position and used as the input for the next iteration. The multiplier is shifted the same direction as the accumulated product so that the next bit is examined. The remaining multiplier bits may be contained in the same register as the accumulated product. Many variations have been applied to the basic "shift and add" technique. Rather than just one bit, a group of bits of the multiplier can be examined at a time. The value to be added to the accumulated product is then a multiple (e.g., two times, four times) of the multiplicand and the shift amount is related to the number of bits being examined at a time. Provisions can also be made for the correct interpretation of negative numbers.

In the past, shift-and-add processors have provided a good trade-off between execution speed and number of circuits required. To increase speed of operation, some processors also employ parallel partial product multipliers to perform fixed point multiplication. This type of multiplier simultaneously creates a plurality of partial products from portions of the multiplier and multiplicand. The final product is then produced by adding the partial products together.

DISCLOSURE OF THE INVENTION

The present invention describes a multiplier for multiplying both fixed and floating point numbers which improves upon prior art shift-and-add multipliers and fixed point only partial product multipliers. This is accomplished in a circuit, suitable for implementation using LSI components, in which exponent calculations, postnormalization, and other functions are integrated with a partial product multiplier to create a powerful floating-point and fixed-point multiplier in a single multiply unit. Moreover, double buffering of data allows for overlapped operations. For both types of multiplication, the present invention results in significantly increased scientific performance of the processor.

BEST MODE FOR CARRYING OUT THE INVENTION

The operands and results associated with a computer multiplication operation must be represented in some fashion by binary bits. Fixed-point numbers are formed merely by the two's complement notation. Operand integers are 4 bytes and result integers 8 bytes in length. Floating-point numbers consist of a sign bit, characteristic portion, and fraction portion. A sign bit of 0 implies a positive operand, a 1 implies a negative operand. The exponent is represented in excess-64 notation by 7 characteristic bits. That exponent is the power of 16 by which the fraction is multiplied. The fraction is expressed in hexadecimal digits with the radix point assumed to the immediate left of the high-order fraction digit. The format (data type) determines the number of digits in the fraction: short has 6 digits, long has 14 digits, and extended has 28 digits in the fraction representation.

Figure 1:
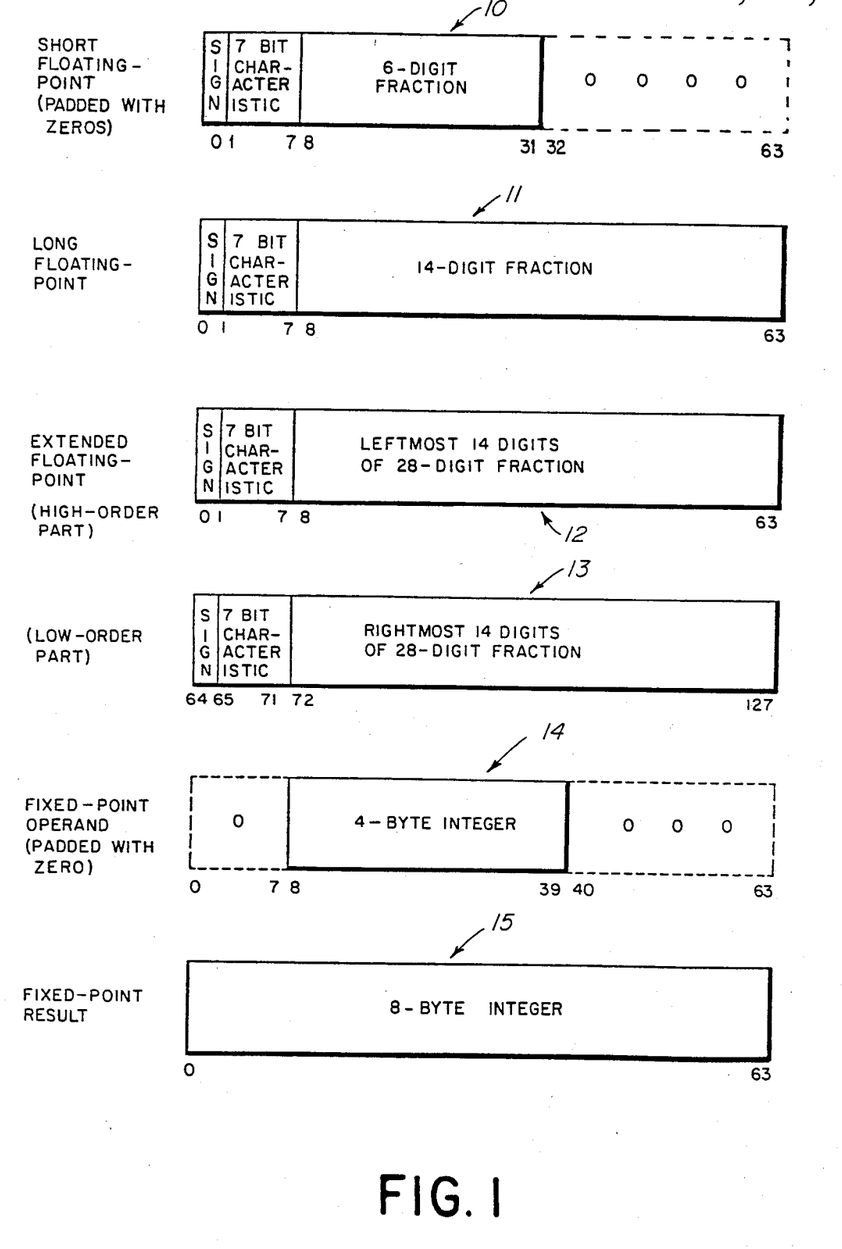
FIG. 1 is an illustration of number representation formats.

Referring to FIG. 1, short floating point format 10 is illustrated as consisting of a sign bit, seven characteristic bits, and 24 bits of fraction information associated with a 6 digit fraction. Long floating point format 11 is illustrated as consisting of a sign bit, 7 characteristic bits and 56 bits of fraction information associated with a 14 digit fraction. Extended floating point format is illustrated as consisting of a higher order part 12 and a lower order part 13. Both higher order part 12 and lower order part 13 have a sign bit, 7 characteristic bits, and 56 bits of fraction information associated with 14 digits of a 28 digit fraction. Higher order part 12 contains fractional information for the leftmost 14 digits while lower order part 13 contains fractional information for the rightmost 14 digits.

Still referring to FIG. 1, fixed point format 14 is illustrated as consisting of 32 bits (i.e., 4 bytes) of integer information. Fixed point result 15 illustrates that the product of two fixed point 4-byte integers is an 8-byte integer.

Figure 2:
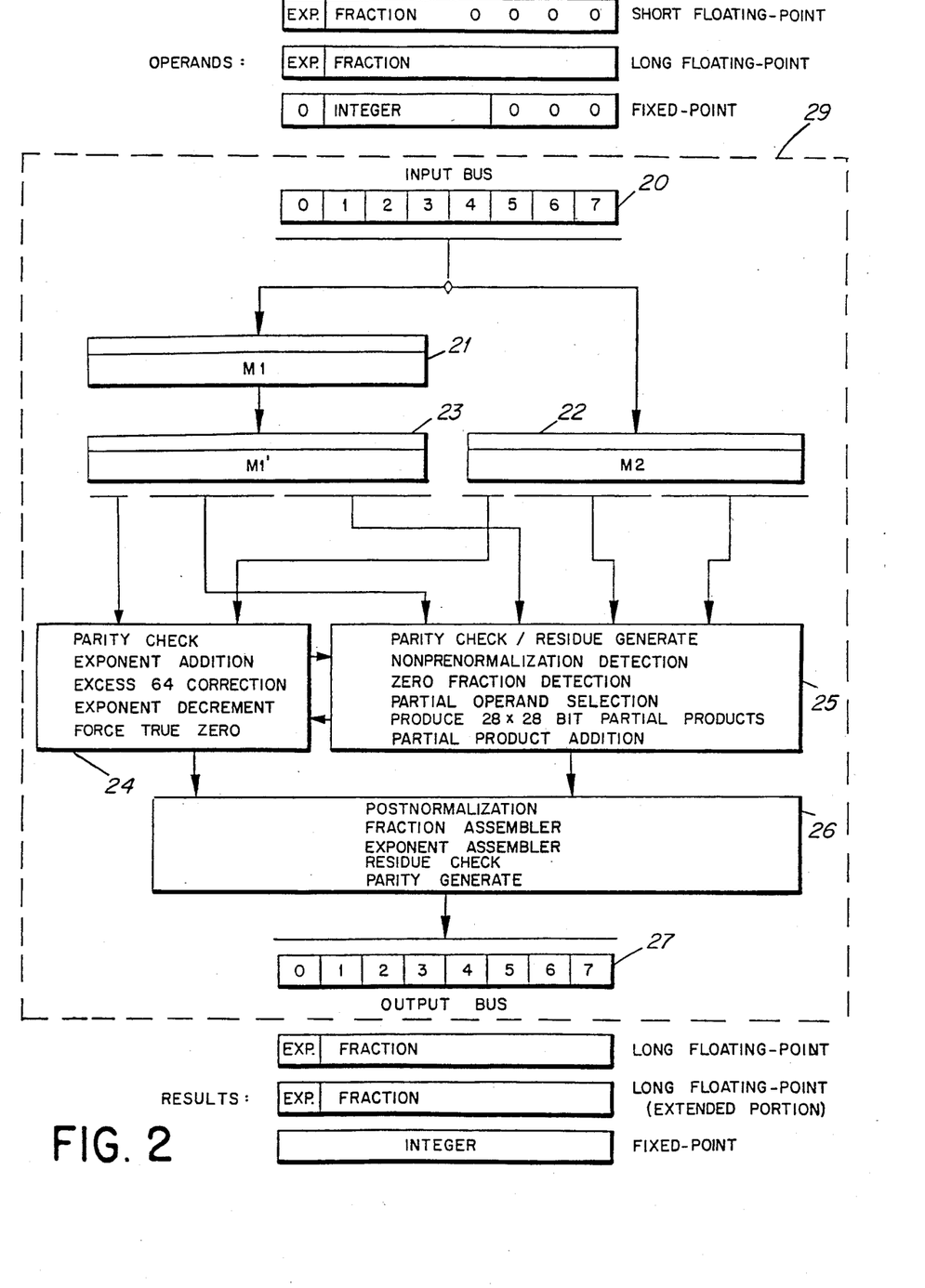
FIG. 2 is a conceptual illustration of the multiplier of the present invention.

Referring to FIG. 2, the multiply unit 29 can be conceptually thought of as a dedicated functional unit attached to two data paths or busses. The 8 byte operands are loaded serially from the input bus 20 into the operand registers 21 and 22. Control for operand loading is the same regardless of the format of the operand or the result. A long floating-point operand will contain a 1 byte exponent and a 7 byte fraction. Short floating-point operands must be padded with zeroes. A fixed-point operand will contain 4 bytes of data padded with zeroes. Note that the distinction between multiplicand and multiplier is not needed. The operands can be thought of simply as two numbers, M1 and M2, which are to be multiplied. Operand M1 is latched in register 21 first, followed by operand M2 being latched in register 22. The contents of register 21 are also copied into register 23. The two operands are then available as inputs to the exponent and multiply logic which contains combinational circuitry. The exponent hardware 24 performs the exponent addition calculation in the appropriate number representation on byte 0 of the operands. Simultaneously, the product of the remaining 7 bytes of the operands is being produced by multiplier hardware 25 in the manner described below. The results of both calculations may be further modified by true zero and postnormalization effects by hardware 24 and 26. If a floating-point multiply long result is requested, the resulting one byte exponent and seven byte fraction (first 14 digits of extended fraction) are gated to the output bus 27 as byte 0 and bytes 1–7, respectively. If a floating-point multiply extended result is requested, the resulting one byte exponent and seven byte fraction (second 14 digits of extended fraction) are gated to the output bus 27 as byte 0 and bytes 1–7, respectively. If a fixed-point multiply result is requested, the resulting 8 byte product is gated to the output bus 27 as bytes 0–7.

Figure 3:
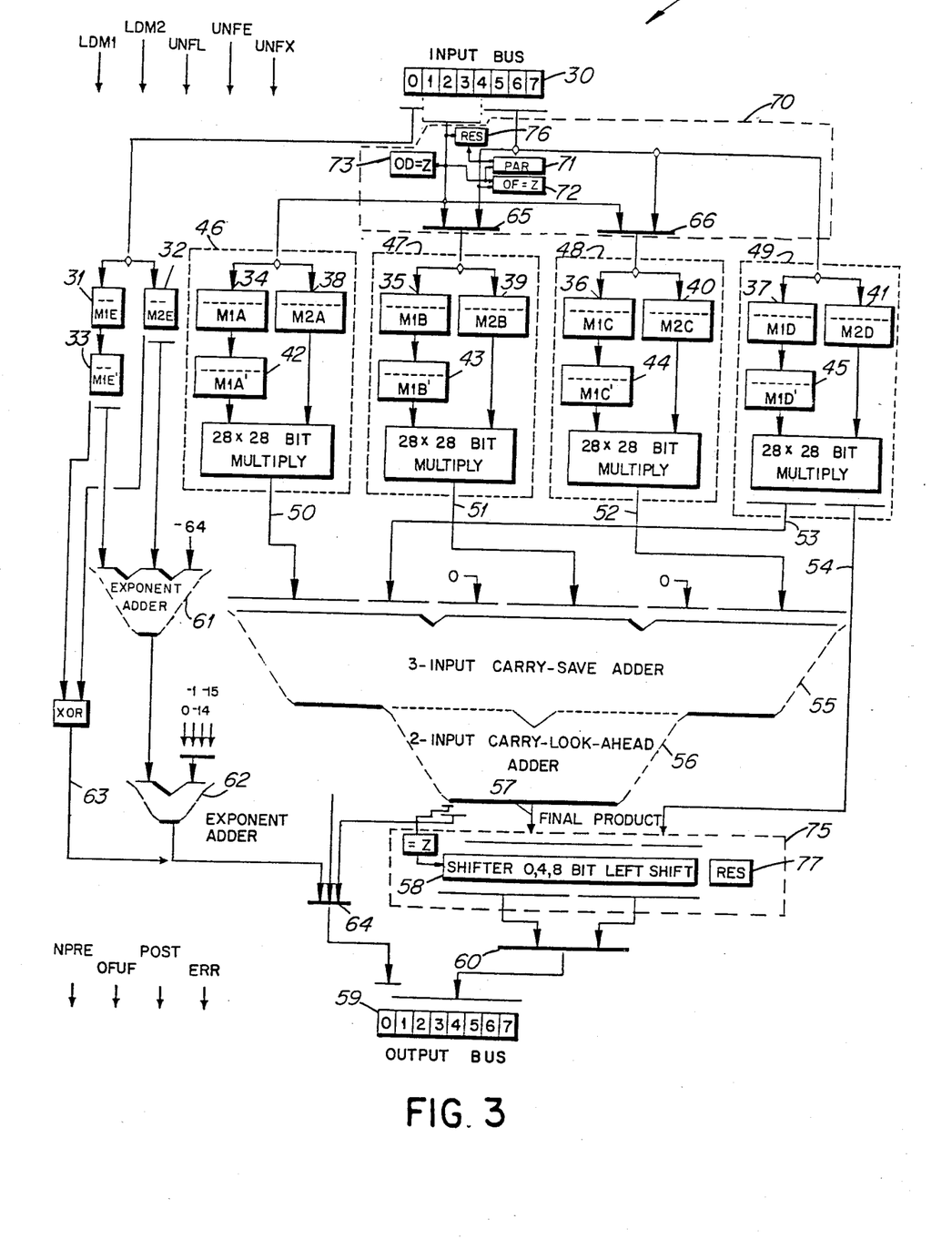
FIG. 3 is an illustration of the preferred embodiment of the multiplier of the present invention.

Referring now to FIG. 3, the detailed operation for floating point multiplication will be described. As noted earlier, the loading of the two operands M1 and M2 occurs in a serial fashion. The operands are assumed to be available on the data input bus 30 by sourcing of the appropriate local storage register or other storage entity. In processors where both operands can be sourced simultaneously, and a double-width data bus or auxiliary bus is available, the present invention could be easily modified to allow parallel loading of both operands. For the sake of simplicity, this description will only discuss serially loading.

The control (e.g., microword) is issued to load the first operand, making the control LDM1 active. The data is sourced and available on the data input bus 30. Byte 0 of the data, containing the sign and exponent information, is latched in the M1 exponent register 31. The remaining bytes 1–7, containing the fraction information, are passed through the partial operand selection logic 70 en route to the appropriate partial operand registers 34, 35, 36 and 37. The LDM1 control dictates that assembler 65 will gate the high order portion and assembler 66 the low order portion of the operand fraction (As used in the description the term "assembler" means a many-to-one multiplexer.). Thus the high order 3½ bytes of the fraction, called M1(HI), become latched in registers 34 and 35. Also the lower order 3½ bytes of the fraction, called M1(LO), become latched in registers 36 and 37.

At some later time the LDM2 control is issued to load the second operand. The data is sourced and available on the data input bus 30. Byte 0 of the data, containing the sign and exponent information, is latched in the M2 exponent register 32. The remaining bytes 1–7, containing the fraction information, are passed through the partial operand selection logic 70 en route to the appropriate partial operand registers 38, 39, 40 and 41. The LDM2 control dictates that assembler 65 will gate the low order portion and assembler 66 the high order portion of the operand fraction. Thus the high order 3½ bytes of the fraction, called M2(HI), become latched in registers 38 and 40. The low order 3½ bytes of the fraction, called M2(LO), become latched in registers 39 and 41.

Also occurring when the LDM2 control is issued is the transfer of the M1 data to the M1' registers. Specifically, the contents of registers 31, 34, 35, 36 and 37 are copied into registers 33, 42, 43, 44 and 45, respectively. The reason for having the M1 operand data double-buffered is to allow for overlapped operation of the multiply unit. Details of overlapped operation are described below.

A parity bit accompanies each byte of input data for the purpose of error detection. Byte 0 parity checking is performed on registers 32 and 33 after the loading is complete. Parity indications on the remaining 7 bytes is obtained by parity check circuitry 71 as the data is passing through the partial operand selection logic 70. This is done "on the fly" because once fraction data is latched in registers, some of the bytes are split between registers on different multiply chips 46, 47, 48 and 49. The parity indications, along with the loading control, determine which operand contained the error.

In addition to the parity, both operand fractions are also examined for residue information. The modulus residue of bytes 1–7 is obtained "on the fly" similar to the parity information. This information is combined with the product residue to indicate possible errors in the multiply unit 29 itself. Details of residue checking are described below.

Two other functions are applied to the operand fraction data as it passes through the partial operand selection circuitry 70. The OPERAND FRACTION=ZERO circuitry 72 detects a condition where either of the operands has a fraction of all zeroes. This condition forces a true zero exponent as required by some computer architectures. The OPERAND DIGIT=ZERO circuitry 73 detects a condition where either of the operands has a fraction whose high order digit is all zeroes. If at the same time neither operand fraction is all zeroes it may be inferred that one (or both) of the operands was not prenormalized. The multiply unit 29 does not perform prenormalization of operands but merely detects that such action is necessary. Since prenormalized operands are generally required in some computer architectures, having conditions OPERAND DIGIT=ZERO for either operand and OPERAND FRACTION=ZERO for neither operand activates status NPRE, which can be used to force a microprogram branch directing the processor to a prenormalization routine. The multiply unit 29 will provide proper arithmetic multiplication regardless of whether operands are prenormalized.

The purpose of partial operand selection is for the single problem of multiplying 56 bits by 56 bits to be reduced to four smaller problems of multipying 28 bits by 28 bits. The latter function can be presently realized in an LSI chip which will be called a "multiply chip". Four such chips 46, 47, 48 and 49 are used in the multiply unit 29 configuration described herein. A given multiply chip requires two 28 bit partial operands which are stored in registers and multiplied by a 28 bit×28 bit multiplier. These partial operands are selected from the operands M1 and M2 and stored in the four multiply chips as follows:

Multiply Chip 46

| Registers | 34 and 42 | M1HI (high order 28 bits of M1 fraction) |
|---|---|---|
| Registers | 38 | M2HI (high order 28 bits of M2 fraction) |

| Multiply Chip 47 | | |
|---|---|---|
| Registers | 35 and 43 | M1HI (high order 28 bits of M1 fraction) |
| Registers | 39 | M2LO (low order 28 bits of M2 fraction) |
| Multiply Chip 48 | | |
| Registers | 36 and 44 | M1LO (low order 28 bits of M1 fraction) |
| Registers | 40 | M2HI (high order 28 bits of M2 fraction) |
| Multiply Chip 49 | | |
| Registers | 37 and 45 | M1LO (low order 28 bits of M1 fraction) |
| Registers | 41 | M2LO (low order 28 bits of M2 fraction) |

The results of each of these partial operand multiplications is termed a partial product. Because of the relative position of the partial operands with respect to the complete operands, a final product can be obtained by addition of the partial products 50, 51, 52, 53 and 54 as follows:

Partial Products (each 56 bits)

| Partial Product 50: | ⊢——⊣ | M1HI × M2HI |
| Partial Product 51: | ⊢——⊣ | M1HI × M2LO |
| Partial Product 52: | ⊢——⊣ | M1LO × M2HI |
| Partial Product 53, 54: | ⊢——⊣ | M1LO × M2LO |
| Final Product 57 (112 bits) ⊢——————⊣ | | M1 × M2 |
| (sum of partial products positioned as shown). | | (fraction portion) |

It can be seen that a three-input adder is needed to sum the interior 56 bits of partial products 50, 51 and 52. For the greatest speed this can be implemented with a three-input two-output carry-save adder 55 feeding a carry-look-ahead full adder 56. The lower-order 28 bits of the final product are merely the lower-order 28 bits 54. The high order 28 bits of the final product are the sum of the high order 28 bits of partial product 50 plus any carries from the sum of the interior 56 bits. Therefore the first adder input receives partial product 50 as bits 0-55 and the high order 28 bits 53 as bits 56-83. The second adder input receives zeroes in bit positions 0-27 and partial product 51 as bits 28-83. The third adder input receives zeroes in bit positions 0-27 and partial product 52 as bits 28-83. The low order 28 bits 54 go directy to the final product shifter 58 in bit positions 84-111. The partial product adder outputs become inputs to the final product shifter 58 in positions 0-83.

The final product 57 is the correct arithmetic result of multiplying operand fractions M1 and M2, regardless of whether they are prenormalized. A type of multiply operation that is frequently used in some computer architectures requires that both operands be prenormalized and the results postnormalized. This requirement is necessary so that significance of the fraction is not diminished by a series of multiplication operations.

The postnormalization hardware 75 examines the high order 4 bits of the final product to determine whether postnormalization should occur. If the high order 4 bits are not all zeroes the final product shifter 58 will perform no shift (shift amount=0). The result gated to the output bus 59 is then the high order 56 bits of the final product 57 if UNFL (unload floating point) is active or the low order 56 bits if UNFE (unload floating point extended portion) is active. If the high order 4 bits are all zeroes, shifter 58 will perform a left shift of 4 bits. The result gated to the output bus 59 is bits 4-59 of the final product 57 for UNFL active or bits 60-111 padded with a zero digit for UNFE active. This has the effect of shifting the final product 57 to the left one digit, while inserting the appropriate final product bits (i.e., "guard digit") for the low order result digit. Thus any floating point multiplication that produces a fraction with a zero high order digit will maintain accuracy by shifting that zero digit out, the rest of the final product bits to the left, and decrementing the exponent. The exponent value must be decremented so that the same number value is represented after the postnormalization shift operation.

The fraction assembler 60 will always gate the high order shifter output for a UNFL unload and the low order shifter output for a UNFE unload. Thus two unload operations are required to obtain the entire extended format results on the output bus 59.

The first byte of a floating-point result consists of a sign bit and a 7-bit characteristic. The resultant sign bit 63 is merely the logical exclusive OR of the sign bits of the operands. The resultant characteristic is derived from the addition of the operand characteristics. Binary +64 is subtracted from the sum of the 7-bit characteristics in exponent adder 61. If postnormalization occurs this characteristic must be decremented by +1 to properly take account of the fraction being shifted left one digit. When an extended result is requested the characteristic must be further reduced by +14 to remain consistent with the low order fraction part. Thus with UNFL active the characteristic is reduced by 0 or +1 depending upon whether postnormalization occurs; with UNFE active the characteristic is reduced by +14 or +15 depending upon whether postnormalization occurs. In exponent adder 62 the proper decrement amount (0, 1, 14 or 15) is subtracted from the output of exponent adder 61. The resultant sign bit 63 and the 7 bit resultant characteristic output from exponent adder 62 is gated to the output bus 59 through the exponent assembler 64 for either UNFL or UNFE unloading. An exception to the above occurs if either operand has a zero fraction (OPERAND FRACTION = ZERO condition), in which case the resultant characteristic and sign bit should be forced to all zeroes so that the entire result is "true zero" as defined in some computer architectures. This is accomplished by gating a byte of all zeroes through exponent assembler 64 to the output bus 59, thereby overriding the calculated exponent result.

The following table illustrates the combinations of exponent and final product bits which may be gated to the output bus 59.

EXP represents the XOR resulting sign bit 63 concatenated with the 7 bit characteristic output from exponent adder 61.

| Unload Cntl | Post-norm | Opd Frac = 0 | Output Bus 59 | | | | | | | |
|---|---|---|---|---|---|---|---|---|---|---|
| | | | 0 | 1 | 2 | 3 | 4 | 5 | 6 | 7 |
| UNFL | no | no | EXP, | ← | ← | ← | FP 0-55 | → | → | → |
| UNFL | no | yes | 00, | ← | ← | ← | FP 0-55 | → | → | → |
| UNFL | yes | no | EXP-1, | ← | ← | ← | FP 4-59 | → | → | → |
| UNFL | yes | yes | 00, | ← | ← | ← | FP 4-59 | → | → | → |
| UNFE | no | no | EXP-14, | ← | ← | ← | FP 56-111 | → | → | → |

| Unload Cntl | Post-norm | Opd Frac = 0 | Output Bus 59 | | | | | | | |
|---|---|---|---|---|---|---|---|---|---|---|
| | | | 0 | 1 | 2 | 3 | 4 | 5 | 6 | 7 |
| UNFE | no | yes | 00, | ← | ← | ← | FP 56–111 | → | → | → |
| UNFE | yes | no | EXP-15, | ← | ← | ← | FP 60–111 | → | → | 0 |
| UNFE | yes | yes | 00, | ← | ← | ← | FP 60–111 | → | → | 0 |
| UNFX | n/a | n/a | ← | ← | ← | ← | FP 0–63 | → | → | → |

Three different conditions are sensed by the multiply unit 29 and communicated to the rest of the processor via status indications. These are non-prenormalized operand(s) (NPRE), postnormalization (POST), and exponent overflow/underflow (OFUF).

If the resulting characteristic of the normalized product exceeds 127 (exponent greater than +63) or is less than zero (exponent less than −64) then an exponent overflow or underflow condition exists, respectively. The status OFUF is activated to signify that such a condition exists. Microcode error routines can generate the correct architected exception behavior based on the final product and the status conditions. The multiply unit 29 will usually create the proper exception result by default.

Some architected multiply operations require that both operands be prenormalized (high order fraction digit not all zeroes) before the operation takes place. If normalized numbers are maintained throughout a series of operations, it may be assumed that the operands are already prenormalized. To take advantage of this, multiplication occurs internally in the multiply unit 29 regardless of the operands. Microcode then tests the NPRE status as the results are being obtained so that corrective action can later be taken in the statistically unlikely event that the operands were in fact not prenormalized. Status NPRE will be activated if either of the operands is not prenormalized and neither of the operands has a zero fraction.

If postnormalization has occurred while generating the proper floating point result, then status POST will be activated. This may be used by microcode exception-handling routines to aid in analysis of exponent overflow/underflow situations.

The hardware multiplier of the present invention can also produce fixed point multiplication results in a manner similar to that for floating point multiplication. With respect to fixed point multiplication, however, result unloading is done differently and the exponent calculation and postnormalization hardware are not used.

To load, a fixed point operand must be present on bytes 1–4 of the input bus 30, with zeroes elsewhere on the bus. Actually, some data, such as byte 0, will not affect the result even if not zeroes. Operand M1 is loaded before operand M2, just as in the floating point case. The operand data of bytes 1–4 are handled by the operand selection hardware, operand registers, multiply chips, and adders just as if it was part of a floating point operand. Note that the first 8 bytes of the final product (without postnormalization) provide the proper result bits for the fixed point multiply.

To obtain the desired 8 byte result on the output bus, the exponent assembler 64 must gate the high order 8 bits of the final product, the shifter 58 must shift by eight, and the fraction assembler 60 must gate the high order 56 bits (bits 8–63 of the final product). Neither postnormalization nor exponent calculation hardware have any effect on the result when a fixed point unload is specified. Status conditions NPRE, POST, and OFUF are meaningless in this situation and ignored during fixed point operation.

Note that this fixed point multiplication result is valid for positive operands only. Microcode or special hardware must test the operands for bit 0 being a logical 1 (implying negative number in two's complement representation) and provide the correct complementation of operands or result correction for fixed point multiplication involving negative operands. Because fraction operand data is always interpreted by the hardware as positive, any negative fixed point operand will be interpreted as being positive and $2^{32}$ greater in magnitude. Thus if fixed point multiplication involves a positive and a negative operand the multiplication will be performed as if they were a positive operand and a positive operand which is $2^{32}$ greater in value. Thus the correct result can be obtained from the multiply unit 29 result by subtracting from it the positive operand times $2^{32}$. If both operands are negative then complementing them both before loading will allow the correct result to be obtained directly with an UNFX unload.

In addition to performing floating point and fixed point multiplication, it is also desirable to detect any failure that may occur in the circuitry in or around the multiply unit 29 during operation that would generate erroneous results. The error line ERR is activated for an operand parity error, an exponent adder error, or a residue error in the multiplication hardware. Parity is also generated along with the final result so that elements receiving the output bus can perform error checking.

Operands are received by the multiply unit 29 as 8 byte quantities. Each byte is accompanied by an additional bit to indicate data parity. Any single bit error will thus be detected as an operand parity error and the error line ERR will be activated.

Both exponent adders can use any standard technique such as dual-rail, parity-predict, or residue method for error detection.

For internal multiplier error detection the modulus residue method is used. Mathematically, the residue of an algebraic result will always equal the residue found by applying the same algebraic operation to the residue of the operands. As this applies to the multiply unit 29, the residue of the final product should be identical to the residue of the product of the operand residues. If it is not, some internal error has occurred. Thus, the residue of each operand is calculated as it is received in element 76. The residue of the final product (before postnormalization) is also calculated when that product becomes available in element 77. As a check, the final product residue is compared with the residue found by multiplying the two operand residues. If these are unequal, the error line ERR will be activated.

In processors with very short machine cycle times it may be necessary to allow an extra cycle for the results to propagate through the combinational circuitry. A "dummy" microword could be inserted in the multiply microcode routine between the load and unload control words. This can be used to advantage in vector processing by performing overlapped loading of the operands. For example, while multiplication is occurring with registers 42 and 38 the next M1 operand can be loaded in register 34 with a LDM1 control. After unloading the present results only a LDM2 control is needed to load the next M2 operand and pass the new M1 contents to M1' registers. In this way lengthy vector multiplications can be performed with an average of one less microword per loop iteration.

Whereas we have illustrated and described the preferred embodiments of our invention, it is understood that we do not limit ourselves to the precise constructions disclosed herein. We expressly reserve the right to all changes and modifications coming within the scope of the invention as defined in the appended claims.

We claim:

1. A high speed digital multiplier unit for mulitplying two operands in a parallel fashion, comprising:
a fixed point and floating point multiplication means further comprising:
an input bus for receiving said operands;
a plurality of registers coupled to said input bus for receiving at least a portion of each of two operands;
a plurality of parallel multipliers, each of said plurality of parallel multipliers coupled to at least two of said plurality of registers for generating the partial produce created by multiplying the contents of at least two of said plurality of registers;
an adder means coupled to each of said plurality of parallel multipliers for summing the partial products generated by each of said plurality of parallel multipliers to produce a final product;
a plurality of exponent registers coupled to said input bus for receiving the sign and exponent information associated with said two operands;
a logic means coupled to at least two of said plurality of exponent registers for generating a resultant sign bit;
an exponent adder means coupled to at least two of said plurality of exponent registers for generating a plurality of resultant characteristic bits;
an exponent assembler means coupled to said adder means, said logic means and said exponent adder means for assembling the correct sign and characteristic bits associated with said final product;
a shifter means coupled to said adder means and at least one of said plurality of multipliers for performing any necessary shifts of the final product;
a fraction assembler means coupled to said shifter means for assembling the correct fraction bits associated with said final product; and
an output bus coupled to said exponent assembler means and said fraction assembler means for receiving the sign, characteristic and fraction bits which comprise the product of said two operands.

2. A multiplier unit according to claim 1 further comprising:
postnormalization means coupled to said adder means and said shifter means for shifting said final product and decrementing said exponent adder means when at least one zero high order digit exists in said final product.

3. A multiplier unit according to claim 1 further comprising:
error detection means coupled to said plurality of register exponent adder means, said plurality of multipliers, and said adder means for detecting operand parity errors, exponent adder errors, and multiplication hardware errors.

4. A multiplier unit according to claim 1 wherein each of said plurality of registers further comprises:
a first register coupled to said input bus for receiving a portion of one of said two operands;
a second register coupled to said input bus for receiving a portion of the other of said two operands; and
a third register coupled to said first register for receiving the contents of said first register when said second register receives said portion of the other of said two operands
whereby said multiplier unit provides for overlapped loading of operands.

5. A multiplier unit according to claim 2 further comprising:
error detection means coupled to said plurality of registers, said exponent adder means, said plurality of multipliers, and said adder means for detecting operand parity errors, exponent adder errors, and multiplication hardware errors.

6. A multiplier unit according to claim 2 wherein each of said plurality of registers further comprises:
a first register coupled to said input bus for receiving a portion of one of said two operands;
a second register coupled to said input bus for receiving a portion of the other of said two operands; and
a third register coupled to said first register for receiving the contents of said first register when said second register receives said portion of the other of said two operands
whereby said multiplier unit provides for overlapped loading of operands.

7. A multiplier unit according to claim 3 wherein each of said plurality of registers further comprises:
a first register coupled to said input bus for receiving a portion of one of said two operands;
a second register coupled to said input bus for receiving a portion of the other of said two operands; and
a third register coupled to said first register for receiving the contents of said first register when said second register receives said portion of the other of said two operands
whereby said multiplier unit provides for overlapped loading of operands.

8. A multiplier unit according to claim 5 wherein each of said plurality of registers further comprises:
a first register coupled to said input bus for receiving a portion of one of said two operands;
a second register coupled to said input bus for receiving a portion of the other of said two operands; and
a third register coupled to said first register for receiving the contents of said first register when said second register receives said portion of the other of said two operands whereby said multiplier unit provides for overlapped loading of operands.

9. A high speed digital multiplier unit for multiplying first and second operands in a parallel fashion, comprising:
a fixed point and floating point m:ltiplication means further comprising:
an input bus;
a first plurality of registers coupled to said input bus for receiving a portion of one of said two operands;
a second plurality of registers coupled to said input bus for receiving a portion of the other of said two operands;
a third plurality of registers each coupled to a different one of said first plurality of registers for receiving the contents of said first plurality of registers when said second plurality of registers receives said portion of the other of said two operands;

a parallel multiplier means coupled to said second and third plurality of registers for generating partial products of said operands;

an adder means coupled to said parallel multiplier means for summing said partial products to produce a final product;

an exponent means coupled to said input bus for generating the correct sign and characteristic bits associated with said final product;

a postnormalization means coupled to said adder means for shifting said final product and decrementing said exponent means when at least one zero high order digit exists in said final product and;

an error detection means coupled to said first and second plurality of registers, said exponent means, said parallel multiplier means, and said adder means for detecting operand parity errors, exponent adder errors, and multiplication hardware errors whereby said multiplier unit provides for overlapped loading of operands.

* * * * *

UNITED STATES PATENT AND TRADEMARK OFFICE
CERTIFICATE OF CORRECTION

PATENT NO.    : 4,594,679
DATED         : June 10, 1986
INVENTOR(S)   : Steven L. George; James L. Hefner It is certified that error appears in the above-identified patent and that said Letters Patent is hereby corrected as shown below:

In the Title:

Title should read:   --High Speed Hardware Multiplier for Fixed and Floating Point Operands--

In the claims:

Claim 1, line 21    Delete "produce" and substitute therefor --product--.
Claim 3, lines 60-61
                Delete "register" and substitute therefor --registers, and--.

Signed and Sealed this

Thirtieth Day of December, 1986

*Attest:*

DONALD J. QUIGG

*Attesting Officer*   *Commissioner of Patents and Trademarks*